(12) United States Patent
Tower, III et al.

(10) Patent No.: US 10,175,074 B2
(45) Date of Patent: Jan. 8, 2019

(54) SYSTEMS AND METHODS FOR DETECTING LEAKS IN AN ELECTROMAGNETIC FLOWMETER

(71) Applicant: Schneider Electric Systems USA, Inc., Foxboro, MA (US)

(72) Inventors: Daniel G. Tower, III, Wrentham, MA (US); John Yuxiang Xie, Franklin, MA (US); James L. Pizzuti, West Warwick, RI (US); Antoine DeProost, Wrentham, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 0 days.

(21) Appl. No.: 15/728,722

(22) Filed: Oct. 10, 2017

(65) Prior Publication Data

US 2018/0031400 A1    Feb. 1, 2018

Related U.S. Application Data

(63) Continuation of application No. 14/659,210, filed on Mar. 16, 2015, now Pat. No. 9,810,559.

(51) Int. Cl.
*G01F 1/60* (2006.01)
*G01N 27/02* (2006.01)
*G01F 1/58* (2006.01)

(52) U.S. Cl.
CPC .............. *G01F 1/60* (2013.01); *G01F 1/584* (2013.01)

(58) Field of Classification Search
CPC .... G01F 1/60; G01F 1/58; G01F 1/56; G01N 27/02
See application file for complete search history.

(56) References Cited

U.S. PATENT DOCUMENTS 6,611,775 B1  8/2003 Coursolle et al.
7,921,734 B2  4/2011 Foss et al.
(Continued)

FOREIGN PATENT DOCUMENTS

CN    201007665 Y    1/2008
JP    2002139355 A    5/2002
(Continued)

OTHER PUBLICATIONS

Partial European Search Report for 16160725.4, dated Feb. 7, 2017.

*Primary Examiner* — Jewel V Dowtin
(74) *Attorney, Agent, or Firm* — Stinson Leonard Street LLP

(57) ABSTRACT

An electromagnetic flowmeter has a flowtube configured to carry a conductive fluid. The flowtube has wall made of a conductive material. The wall has an inner surface surrounding a fluid flow path for the fluid. A non-conductive liner is positioned to electrically insulate the flowtube wall from the fluid. The flowtube and non-conductive liner define an electrode mounting hole. An electrode extends through the electrode mounting hole. The electrode and the non-conductive liner form a fluidic seal between the electrode mounting hole and the fluid flow path. At least a portion of the electrode is arranged in fluid communication with the flowtube within the electrode mounting hole. A short circuit detector can detect failure of the seal when conductive fluid that has leaked past the seal creates a short circuit as a result of the fluid communication between the flowtube and the electrode mounting hole.

20 Claims, 11 Drawing Sheets

(56) References Cited

U.S. PATENT DOCUMENTS

| | | | | |
|---|---|---|---|---|
| 8,571,816 B2* | 10/2013 | Inoue | ............... | G01F 1/60 |
| | | | | 331/65 |
| 8,682,600 B2* | 3/2014 | Genta | ............... | G01M 3/18 |
| | | | | 340/432 |
| 9,285,256 B1* | 3/2016 | Chang | ............... | G01F 1/60 |
| 2007/0194792 A1* | 8/2007 | Quackenbush | ...... | G01N 27/023 |
| | | | | 324/445 |
| 2016/0097662 A1* | 4/2016 | Chang | ............... | G01F 1/60 |
| | | | | 73/861.12 |
| 2016/0149395 A1* | 5/2016 | Fan | ............... | G01F 23/26 |
| | | | | 307/118 |

FOREIGN PATENT DOCUMENTS

| | | | |
|---|---|---|---|
| JP | 2003028683 A | 1/2003 |
| JP | 2010085349 A | 4/2010 |
| WO | 01/90704 A2 | 11/2001 |

\* cited by examiner

SYSTEMS AND METHODS FOR DETECTING LEAKS IN AN ELECTROMAGNETIC FLOWMETER

CROSS-REFERENCE TO RELATED APPLICATION

This application is a continuation of co-pending U.S. patent application Ser. No. 14/659,210, filed Mar. 16, 2015, the entire contents of which are hereby expressly incorporated by reference, including the contents and teachings of any references contained therein.

FIELD OF INVENTION

Aspects of the present invention relate generally to electromagnetic flowmeters and more particularly to systems and methods for detecting leakage of fluid from a flowtube of an electromagnetic flowmeter.

BACKGROUND

Electromagnetic flowmeters (which are sometimes referred to as magnetic flowmeters or "mag meters") measure the flow rate of an electrically conductive fluid through a flowtube. In a conventional electromagnetic flowmeter, electrical coils are mounted on opposite sides of the tube and energized to produce an electromagnetic field perpendicular to the direction of fluid flow in the flowtube. When a conductive fluid flows through the electromagnetic field, an electric field is generated in the fluid that can be measured to determine the flow rate. In a typical set up, a pair of electrodes extends through the wall of the flowtube and into the fluid for measuring the strength of the electric field to determine the flow rate. Sometimes additional electrodes extend through the wall of the flowtube into a conduit therein in order to provide empty pipe detection or to ground the liquid. Each point where an electrode extends through the flowtube wall into the conduit requires a so-called process penetration. As illustrated in FIG. 1, a conventional electrode 15 includes a head 19 and a shank 21 extending away from the head. The shank 21 is inserted into an opening 17 forming the process penetration so the head 19 is in the conduit 7 formed by the flowtube 3 and so the shank extends through the flowtube wall 5. A fastener 25 (e.g., a threaded nut) is used to hold the electrode is in this position.

The process penetrations should be sealed to keep the fluid from leaking into the process penetration as it flows through the flowmeter 1. One way this is done is to provide serrations 23 on the back side of the head 19 of each electrode 15. The inner surface of the flow tube 3 is commonly lined with an electrically insulating and chemically resistant liner 11 to prevent the conductive fluid from creating a short circuit between the electrode 15 and the flowtube wall 5, which is commonly made of an electrically conductive material such as metal. Thus, when the nut or other fastener 25 is tightened, the serrations 23 on the back of the electrode head 19 dig into the liner 11 and form a seal between the head of the electrode 15 and the liner. This seal is known as the primary seal. The shank 21 of the electrode 15 is insulated from the electrically conductive part of the flowtube wall 5 by an insulating sheath 31 surrounding at least the segment of the shank that is adjacent the conductive flowtube wall. If fluid leaks past the primary seal, it will also have to flow past the insulating sheath 31 to completely escape through the process penetration. As a result, fluid can leak through the liner 11 and contact the flowtube 3 without any evidence of the leak being visible from outside the flowtube 3.

The fluids metered by electromagnetic flowmeters can include very corrosive and/or caustic materials. In some processes the fluids can also be at a fairly high temperature when they flow through the electromagnetic meter, which can increase the rate at which the fluid causes damage to other materials (e.g., the flowtube wall 5). The present inventors have noted that fluids may leak past the primary seal and cause extensive corrosion of the flowtube wall 5 before a leak is detected. This can present a significant hazard because damage to the flowtube wall 5 can impair the pressure containment capability of the flowtube. Thus, the leak may not be detected until the flowtube bursts and releases the corrosive fluid in a catastrophic failure.

SUMMARY

One aspect of the invention is an electromagnetic flowmeter. The flowmeter has a flowtube configured to carry a flowing conductive fluid. The flowtube has a flowtube wall including a conductive material. The flowtube wall has an inner surface surrounding a fluid flow path for the conductive fluid. A non-conductive liner is positioned to electrically insulate the flowtube wall from the conductive fluid. The flowtube and non-conductive liner define an electrode mounting hole. An electrode extends through the electrode mounting hole. The electrode and the non-conductive liner form a fluidic seal between the electrode mounting hole and the fluid flow path. At least a portion of the electrode is arranged in fluid communication with the flowtube within the electrode mounting hole.

Another aspect of the invention is a method of making an electromagnetic flowmeter. The method includes providing a flowtube including an axis along which fluid can flow through the flowtube. The flowtube also has an outer surface and an inner surface. The flowtube is electrically conductive and configured so that the inner surface is electrically insulated from fluid flow passing through the flowtube. The flowtube includes an electrode mounting hole extending radially with respect to the axis through a wall of the flowtube, including the outer surface and the inner surface. An electrode is installed in the electrode mounting hole so that at least a portion of the electrode in the mounting hole is in fluid communication with the flowtube wall within the electrode mounting hole. The electrode is operatively sealed with the outer and inner surfaces of the flowtube. A short circuit detector is connected to the flowtube and electrode, whereby should the seal between the electrode and the inner surface of the flowtube fail, fluid flowing through the flowtube and entering the electrode mounting hole has access to the electrode for creating a short circuit detectable by the short circuit detector.

Yet another aspect of the invention is a leak detection system for detecting a leak in an electromagnetic flowmeter having an electromagnetic field source for generating an electromagnetic field in a fluid flowing through the flowmeter that changes periodically at a drive frequency and first and second electrodes to detect a voltage induced in the fluid. The leak detection system includes a leak detection processor connected to the first and second electrodes to receive first and second signals representative of the voltage detected by the first and second electrodes, respectively. The leak detection processor is configured to analyze a content of at least the first signal at the drive frequency to determine whether the first signal is affected by a leak in the flowmeter and provide an output indicative of a detected leak when the leak detection processor determines that the first signal is affected by the leak in the flowmeter.

Still another aspect of the invention is a method for detecting a leak in an electromagnetic flowmeter having an electromagnetic field source configured to generate an electromagnetic field in a fluid flowing through the flowmeter that changes periodically at a drive frequency and at least first and second electrodes configured to detect a voltage induced in the fluid in response to the electromagnetic field. The method includes analyzing a content of a signal from at least one of the first and second electrodes at the drive frequency. A leak in the flowmeter is detected using the content of the first signal. An indication of a detected leak is provided when the leak is detected.

Other objects and features of the invention will be in a part apparent and in part pointed out hereinafter.

BRIEF DESCRIPTION OF DRAWINGS

Corresponding reference characters represent corresponding features throughout the drawings.

DETAILED DESCRIPTION

Figure 1:
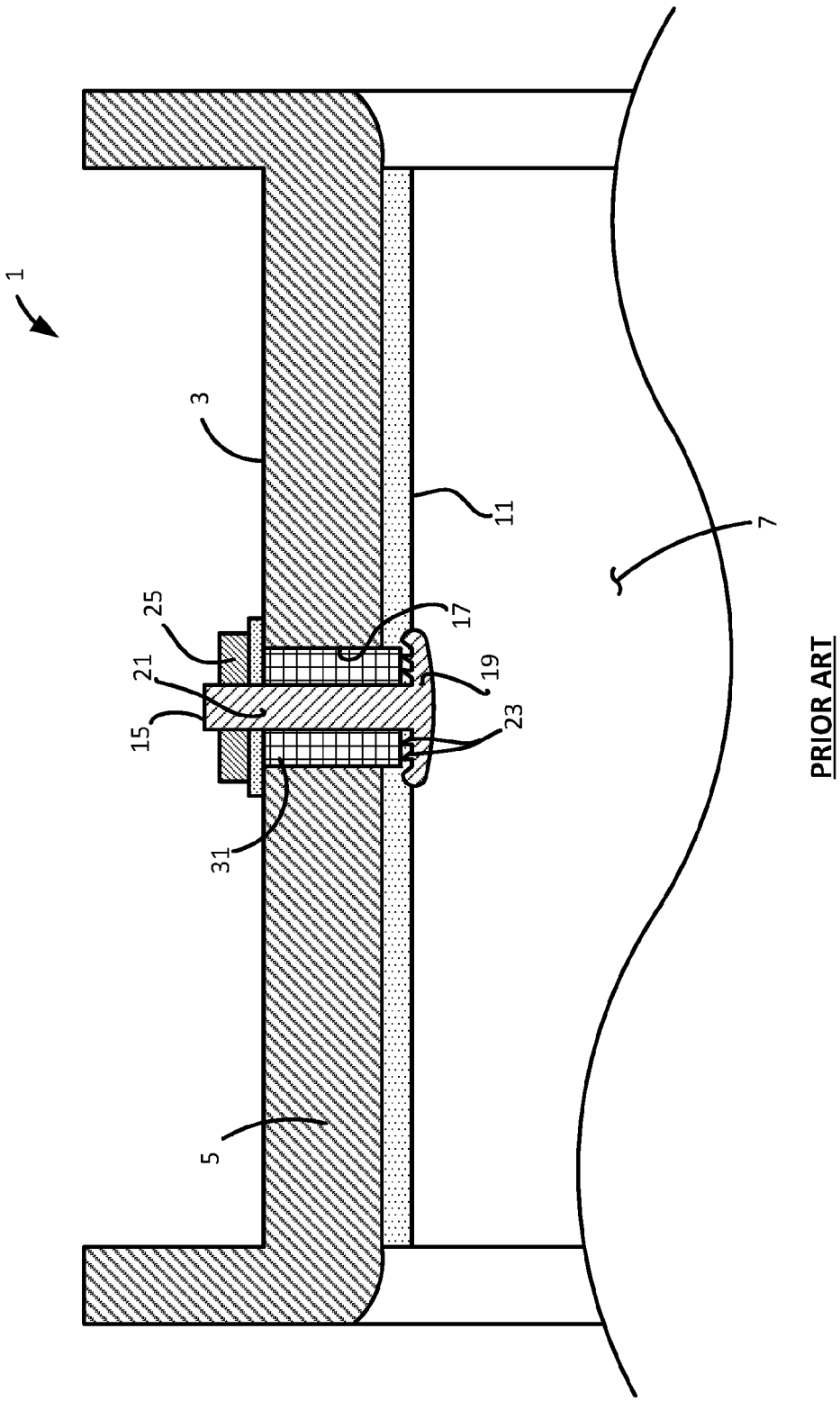
FIG. 1 is a side elevation of a prior art electromagnetic flowmeter illustrated in cross section showing structures associated with a process penetration for an electrode.
Figure 2:
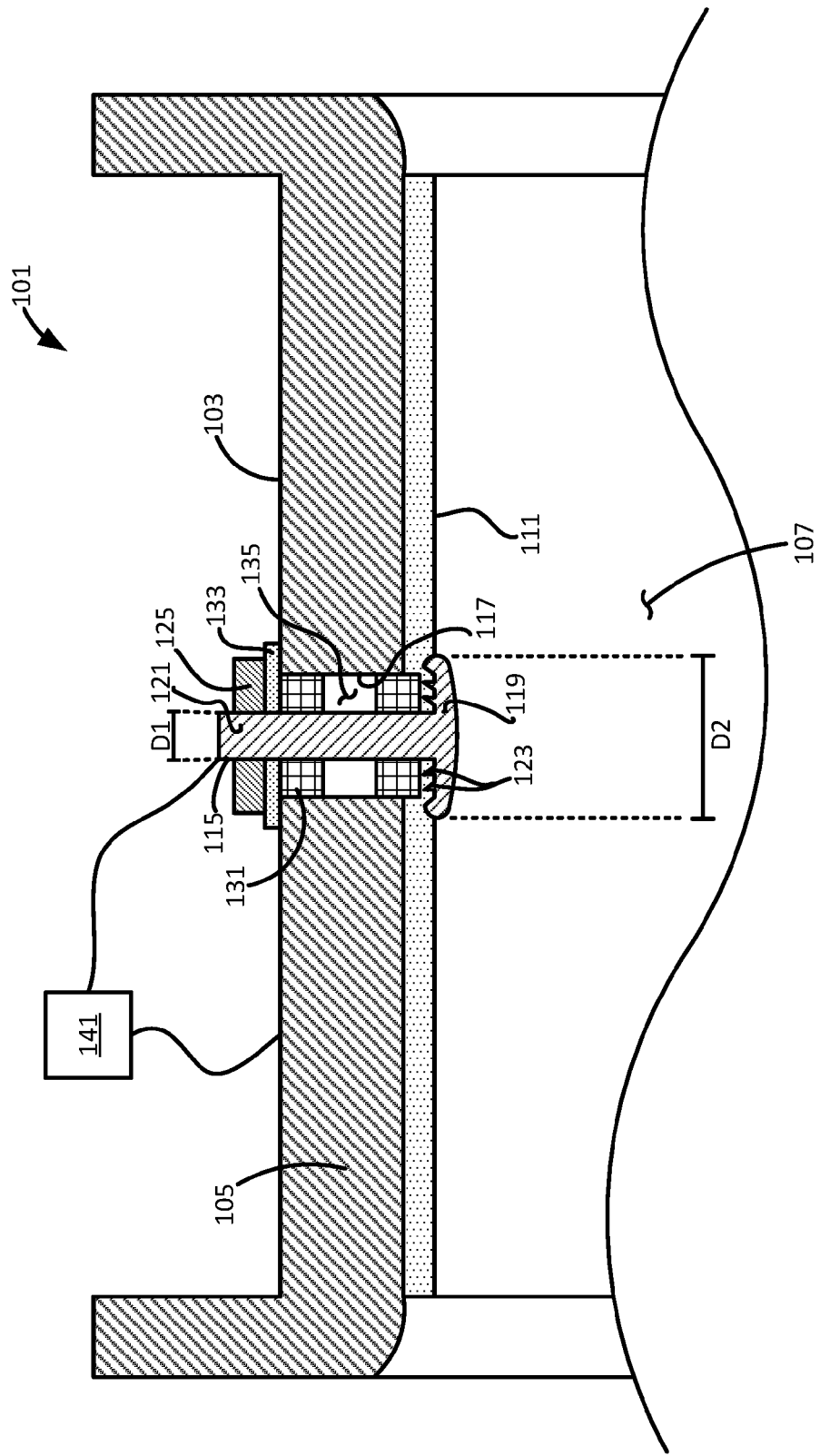
FIG. 2 is a side elevation of one embodiment of an electromagnetic flowmeter of the present invention illustrated in cross section showing structures associated with a process penetration for an electrode.

Referring now to the drawings, first to FIG. 2, one embodiment of an electromagnetic flowmeter is generally designated 101. The flowmeter 101 includes a flowtube 103 configured to carry a flowing conductive fluid through the flowmeter 101. For example, the flowtube 103 suitably includes a generally cylindrical or tubular wall 105 having an inner surface surrounding a flow path 107 extending between opposite ends of the flowtube for flow of fluid through the flowmeter 101. The flowtube 103 is suitably made of an electrically conductive material, such as stainless steel or another suitable metal. A non-conductive liner 111 lines the inner surface of the flowtube wall 105 to electrically insulate the flowtube wall from the conductive fluid. The non-conductive liner 111 may have any of several suitable configurations, such as a coating, a separate liner attached to the inner surface of the flowtube 103, a treatment of the material of the flowtube adjacent the inner surface to provide a few examples.

The flowmeter 101 has an electrode 115 extending through a process penetration formed by an electrode mounting hole 117 extending through the flowtube wall 105 and the non-conductive liner 111. The electrode 115 includes a head 119 and a shank 121 extending away from the head. The shank 121 has a shank diameter D1 and the head 119 has a head diameter D2 larger than the shank diameter. As illustrated in FIG. 2, the shank 121 extends through the electrode mounting hole 117 in the flowtube wall 105 and non-conductive liner 111. Though not illustrated for clarity, the shank 121 is suitably threaded. The end of the shank 121 opposite the head 119 extends through the flowtube 103 to an exterior of the flowtube. A fastener 125 holds the electrode 115 so the head 119 of the electrode is in contact with the liner 111. The fastener is suitably a threaded nut 125 on the threaded shank 121. The fastener 125 is capable of applying tension to the shank 121 to draw the head 119 of the electrode 115 tightly against the liner 111. In the illustrated embodiment, for example, the threaded nut 125 can be tightened against a non-conductive washer 133 adjacent the exterior of the flowtube 103 to pull the shank 121 farther out of the electrode mounting hole 117 and draw the head 119 tightly against the liner 111 to form a seal. The non-conductive washer 133 suitably prevents the fastener 125 from creating an unwanted electrical connection between the flowtube 103 and the electrode shank 121. The head 119 suitably has a plurality of serrations or teeth 123 positioned to contact the liner 111 when the fastener 125 is tightened. However, the serrations can be omitted within the scope of the invention. Also, although in the illustrated embodiment the electrode 115 includes a threaded shank 121 and the fastener includes a threaded nut 125, it is understood that other types of fastening devices may be used without departing from the scope of the invention.

The electrode shank 121 extends through the conductive flowtube wall 105 and is everywhere spaced apart from the flowtube wall. In the illustrated embodiment, a non-conductive spacer 131 is disposed around at least a portion of the shank 121 in the electrode mounting hole 117 between the shank and the flowtube wall 105. The illustrated spacer 131 has at least one fluidic path 135 extending between the electrode shank 121 and the flowtube wall 105. Under normal circumstances, the fluidic path 135 defined by the spacer 131 is substantially devoid of fluid or other conductive materials. For example, the fluidic path 135 can suitably be filled with air or another non-conductive gas. The spacer 131 is positioned to insulate the electrode 115, and in particular the shank 121 of the electrode, from the conductive flowtube wall 105 at the process penetration under normal circumstances. However, in the event fluid flowing through the flowmeter 101 leaks through the primary seal formed between the head 119 of the electrode 115 and the non-conductive liner 111 and into the fluidic path 135, the conductive fluid can establish a low-resistance electrical connection between the electrode 115 and the conductive flowtube wall 105. Leaking fluid in the fluidic path 135 establishes a short circuit between the electrode 115 and ground (i.e., the flowtube 103) that can be detected without any visual evidence of the leak.

In the illustrated embodiment, the spacer 131 is a cylindrically-shaped sleeve positioned so the electrode shank 121 extends through an axial hole in the sleeve for receiving the shank. In this embodiment, the fluidic path 135 includes a transverse hole extending laterally through the cylindrically-shaped sleeve 131. In particular, the hole 135 extends laterally through the sleeve 131 from the shank 121 to the flowtube wall 105. Though the illustrated embodiment uses the spacer 131, it is also contemplated that the electrode shank 121 may be secured in spaced apart relationship with the flowtube wall 105 (and be electrically insulated therefrom) other ways without departing from the scope of the invention. For example, in some embodiments (not shown), a fastener secures the electrode to the wall in a position in which the shank extends through a process penetration but does not make electrical contact with the wall. Likewise, various differently sized and shaped spacers can be used within the broad scope of the invention. In these alternative embodiments, the flowmeter includes a fluidic path between an electrode (specifically, in some embodiments, an electrode shank) and a conductive flowtube wall. The fluidic path is configured so that, in the event conductive fluid leaks into the fluidic path, the conductive fluid that leaks into the fluidic path establishes an electrical connection between the electrode and the conductive flowtube wall. Likewise, in these embodiments the electrode is electrically insulated from the conductive flowtube wall as long as the conductive fluid does not leak into the fluidic path. In certain of these embodiments, at least a portion of the electrode (e.g., a portion of the shank) and a portion of the flowtube in the electrode mounting hole are in opposed relation, free of obstruction therebetween.

Referring again to the embodiment of FIG. 2, the flowmeter 101 includes a system 141 that monitors for the presence of fluid in the fluid path 135 by assessing electrical impedance between the electrode 115 and the conductive flowtube wall 105. For example, the flowmeter 101 suitably includes a short circuit detector 141 configured to detect whether or not conductive fluid is in the fluid path 135. A suitable short circuit detector can be formed by any electrical components that can be configured to detect electric current passing through the fluidic path 135 between the electrode shank 121 and the flowtube wall 105. Somewhat relatedly, a suitable short circuit detector can be formed by any electrical components that can be configured to detect a change in the overall electrical resistance in the electrical paths between the electrode 115 and the flowtube wall 105. The electrical resistance in the fluidic path 135 will be relatively high when the fluidic path is substantially devoid of fluid and much lower if the fluidic path is filled with conductive fluid. Those skilled in the art will be familiar with many different ways to detect the formation of a short circuit between two nodes in an electrical system (e.g., the electrode and the flowtube wall).

Figure 3:
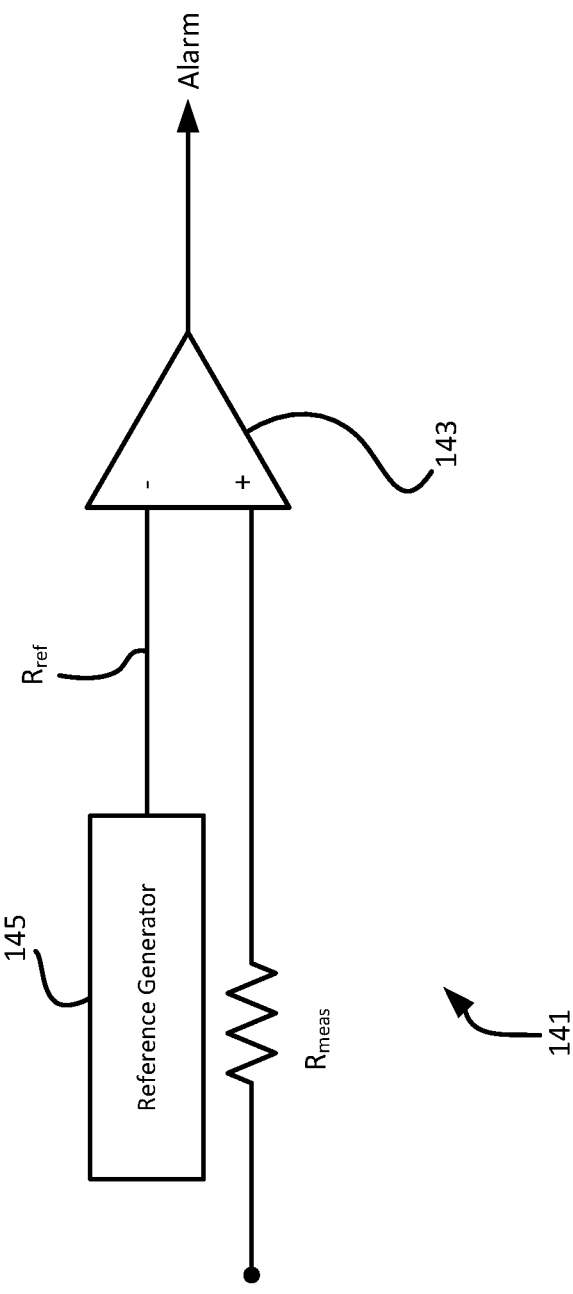
FIG. 3 is a schematic diagram illustrating one embodiment of a circuit for early leak detection at the process penetration illustrated in FIG. 2.
Figure 4:
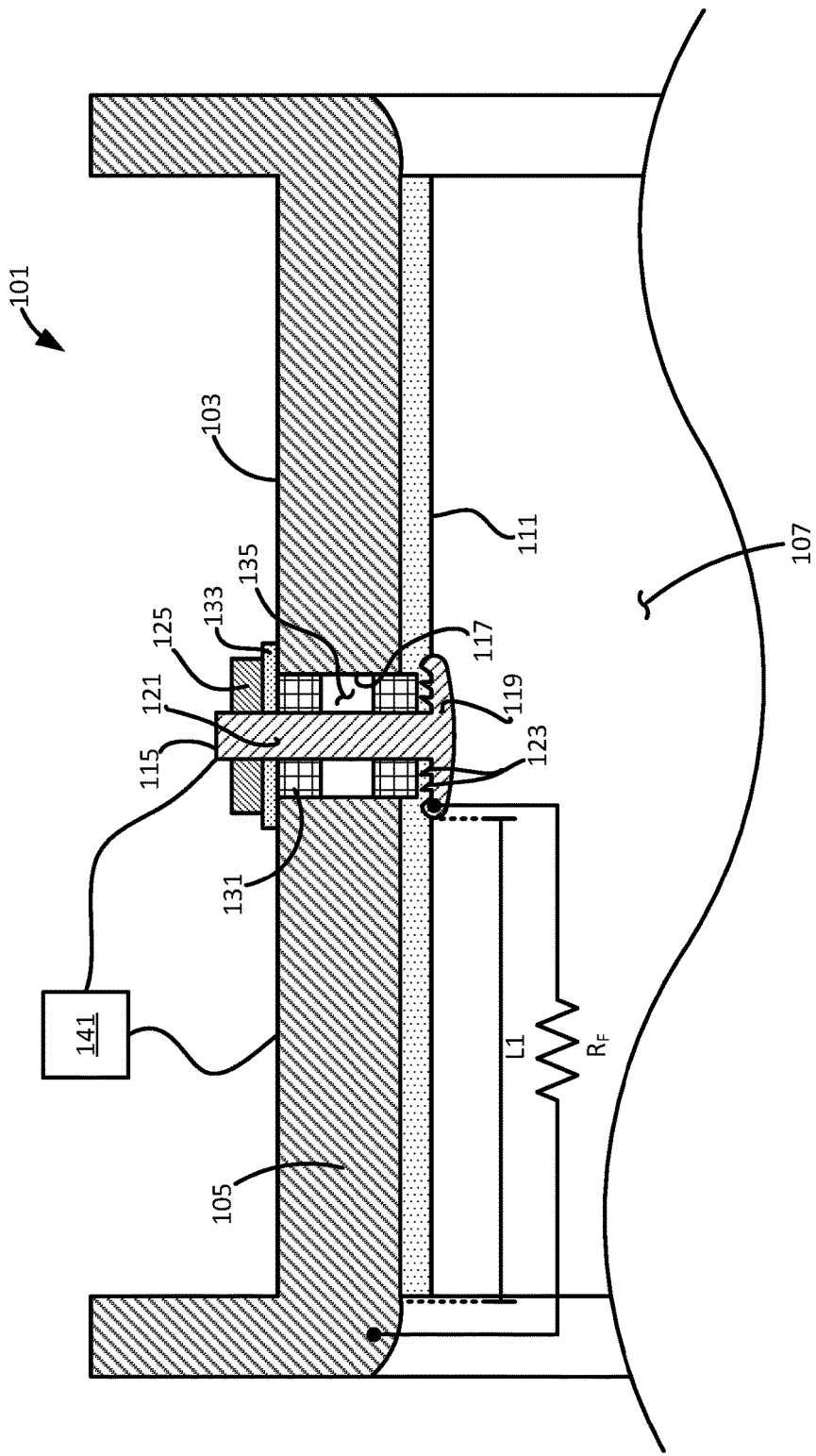
FIG. 4 is a diagram similar to FIG. 2 showing schematically a measured resistance when no leak is detected.
Figure 5:
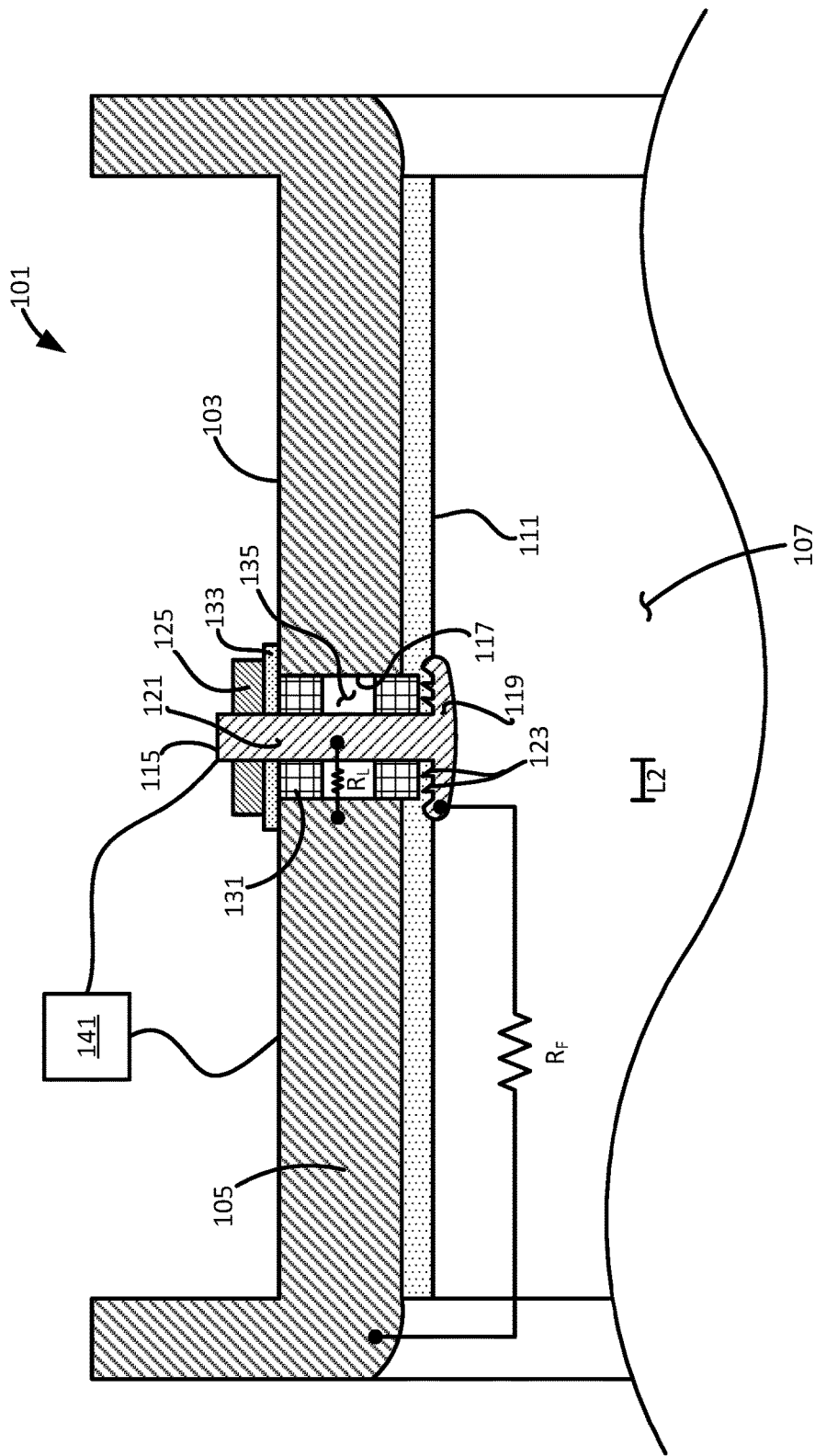
FIG. 5 is a diagram similar to FIG. 4 showing schematically another measured resistance when a leak is detected.

Referring to FIGS. 3-5, in a suitable embodiment the monitoring system 141 includes a comparator 143 that compares the resistance between two nodes (the flowtube 103 and the electrode 115) to a reference value. As discussed above, the flowtube 103 is made from conductive material, and the fluid flowing through the flowtube is likewise conductive. The non-conductive liner 111 extends only a certain length L1 (FIG. 4) from the electrode 115. The fluid in the flow path 107, in normal, non-leaking conditions, electrically connects the electrode 115 to the flowtube 103 at the location where the non-conductive liner 111 ends. Thus, current passes between the electrode 115 and the flowtube 103 over a relatively long length L1 of fluid around the upstream and downstream ends of the liner 111 under normal, non-leaking conditions. For purposes of explanation, the illustrated liner 111 does not coat the entire inner surface of the flowtube 103. However, it should be understood that, in some embodiments, a non-conductive liner will coat the full length of the flowtube. In certain of these embodiments, the flowmeter is fluidly connected to an electrically conductive pipeline. Fluid between the electrode head and the conductive pipeline will provide a normal connection between the electrode and ground. When the electrical resistance in the path 135 is relatively high (no leaks), the resistance between the electrode 115 and the flowtube wall 105 is approximately the same as the resistance to flow of this current through the conductive liquid. Still other connections between an electrode and ground may establish the normal electrical resistance between an electrode and a corresponding flowtube wall (ground) without departing from the scope of the invention. One skilled in the art will appreciate that techniques described with respect to the illustrated embodiment for detecting a deviation in the normal impedance between the electrode 115 and the flowtube 103 can be readily adapted to other normal connections between an electrode and ground.

As shown best in FIG. 4, when no fluid leaks past the non-conductive liner 111, the resistance between the electrode 115 and the flowtube 103 is substantially equal to the normal resistance $R_F$, a relatively high value, which is directly related to the length L1 of fluid connecting the conductive flowtube 103 to the electrode 115 as well as the fluid's resistivity. However, as shown in FIG. 5, when fluid leaks past the non-conductive liner 111, a new, parallel current path is created in the fluidic path 135. The length L2 of the fluidic path 135 is much shorter than the length L1 of fluid between the electrode head 119 and the end of the flowtube liner 111. Thus, the short circuit electrical resistance $R_L$ between the flowtube 103 and the electrode 115 along the fluid path 135, is much lower than the normal resistance $R_F$. When fluid leaks past the non-conductive liner 111, the total resistance $R_T$ between the flowtube 103 and the electrode 115 is equal to the combined resistances of $R_F$ and $R_L$ in parallel:

$$R_T = \frac{R_F * R_L}{R_F + R_L}.$$

When fluid leaks past the non-conductive liner 111 and into the fluidic path 135, the total resistance $R_T$ between the flowtube 103 and the electrode 115 is much lower than when there is no leak. The normal (e.g., when there is no leak) resistance $R_F$ between the flowtube 103 and the electrode 115 can be calculated based on the type of fluid flowing through the flow path 107 (e.g., the resistivity of the fluid) and the length L1 between the electrode head 119 and the end of the non-conductive liner 111. Referring again to FIG. 3, the short circuit detector 141 is configured to detect the presence of conductive fluid in the fluidic path 135. An adjustable reference generator 145 supplies a reference resistance value $R_{ref}$ to the comparator 145. Suitably, the reference resistance value $R_{ref}$ is set at a value slightly lower than the expected fluid resistance $R_F$ (e.g., between about 80% and about 95% of the expected fluid resistance $R_F$) and higher than the expected total resistance $R_T$ in the event of a short circuit. The resistance between the flowtube 105 and the electrode 115 is measured, and the measured resistance $R_{meas}$ is supplied to another input of the comparator 143.

There are various ways the resistance can be measured. For example, a known amount of current can be driven between the flowtube 105 and the electrode 115 for a brief time and the induced voltage during this time can be used as a measure of the resistance and/or used to calculate the resistance. The resistance can be measured in other ways without departing from the scope of the invention. The comparator 143 receives the measured resistance and compares it with the reference value $R_{ref}$. If the measured resistance $R_{meas}$ is less than the reference value $R_{ref}$, the short circuit detector 141 is configured to output an alarm. For example, it may output a signal that causes a local display to indicate the detection of a leak. Likewise, it may output a signal that is transmitted to a distributed control system.

Although only one electrode is illustrated in FIGS. 2, 3, and 5, it is understood that the flowmeter will generally have at least two electrodes on opposite sides of the flowtube. It is also understood that more than two electrodes can be included in the flowmeter, such as to provide empty pipe detection or to ground the fluid flowing through the meter.

Figure 6:
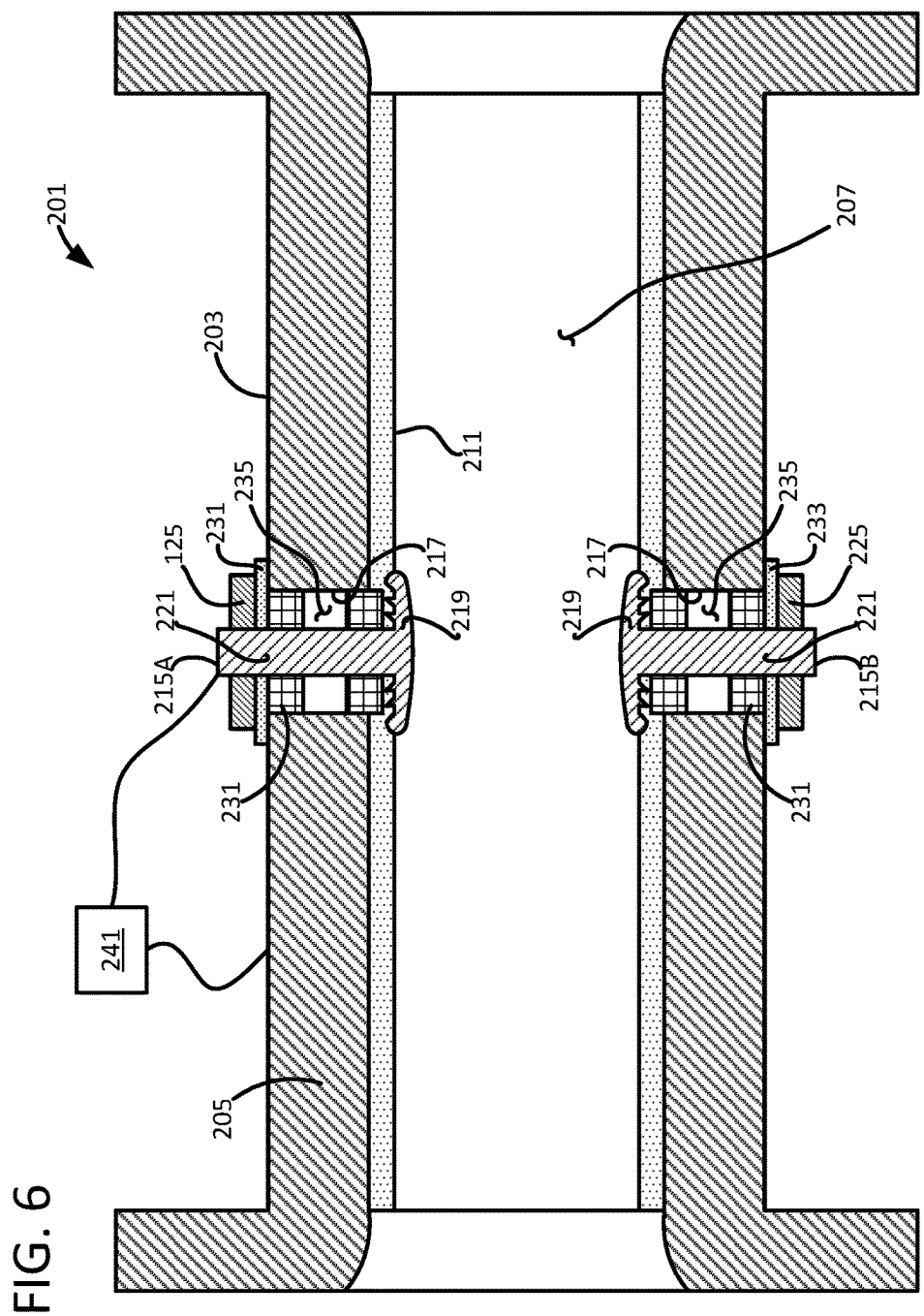
FIG. 6 is a side elevation of another electromagnetic flowmeter of the present invention illustrated in cross section showing structures associated with two process penetrations for electrodes.

Referring to FIG. 6, another embodiment of an electromagnetic flowmeter configured to detect a fluid leak is generally indicated at reference number 201. The electromagnetic flowmeter 201 includes a conductive flowtube 203 and a non-conductive inner liner 211 that insulates the flowtube from a conductive fluid flowing in a flow path 207 extending axially through the flowtube. First and second electrodes 215A, 215B extend through respective process penetrations 217 in the wall 205 of the flowtube 203 at diametrically opposed positions. A pair of drive coils (broadly, an electromagnetic field source; not shown) are located adjacent the outside of the flowtube 203 at diametrically opposed positions angularly spaced from the positions of the electrodes 215A, 215B about a longitudinal axis of the flowtube 203. The drive coils generate an electromagnetic field in the conductive fluid flowing through the flowtube 203, and the electrodes 215A, 215B detect a voltage induced in the fluid as the fluid flows through the electromagnetic field. Suitably, the drive coils generate an electromagnetic field that has an electromagnetic field direction, and the electrodes 215A, 215B detect respective voltages induced in the fluid at diametrically opposed positions oriented perpendicular to the electromagnetic field direction.

In the illustrated embodiment, an insulating sheath 231 separates the shank 221 of each of the first and second electrodes 215A, 215B from the flowtube wall 205, and a non-conductive washer 233 provides electrical insulation between the flowtube wall 205 and the fastener 225 that secures each electrode to the flowtube wall. Thus, as in the previous embodiment, under normal operating conditions, each electrode 215A, 215B is electrically insulated from the flowtube wall 205 at the process penetration 217. When fluid leaks past the seal formed between the head 219 of either electrode 215A, 215B and the inner liner 211, it creates an electrical connection between the respective electrode and the flowtube wall 205 that is not present under normal operating conditions. Though the illustrated insulating sheath 231 provides a transverse hole 235 for creating a direct fluid path between the flowtube wall 205 and the respective electrode 215A, 215B, it will be understood that, even in the absence of such a sheath, leaking fluid can penetrate the seams between the insulating and conductive components to create an undesired electrical connection between the electrode and flowtube wall. A leak detection system 241 detects when a leak in the flowtube creates an undesired electrical connection between one of the first and second electrodes 215A, 215B and the inner liner 211.

Figure 7:
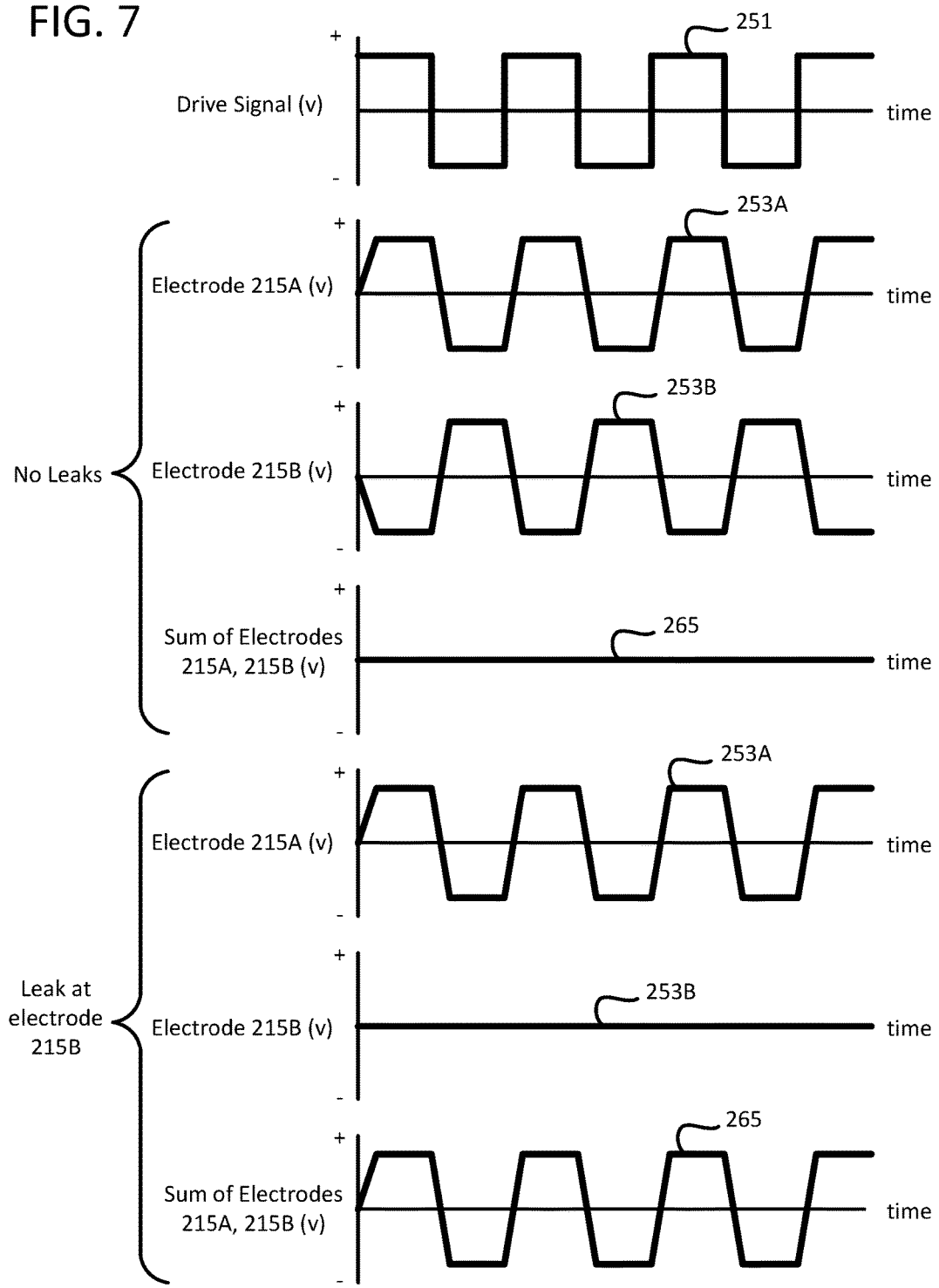
FIG. 7 is a diagram comparing induced voltages detected at respective electrodes of the flowmeter and the summation thereof during normal operating conditions to the corresponding voltages in case of a leak.

Referring to FIG. 7, the drive coils are configured to generate an electromagnetic field 251 that changes periodically at a drive frequency f. The drive frequency can be constant or variable. In the illustrated embodiment, the electromagnetic field 251 is reversed at a constant drive frequency f. However, other changes in the electromagnetic field 251 can also be made periodically without departing from the scope of the invention. The first electrode 215A produces a first voltage signal 253A representative of an induced voltage in the fluid at the head 219 of the first electrode. Likewise, the second electrode 215B produces a second voltage signal 253B representative of an induced voltage in the fluid at the head 219 of the second electrode. Respective flow-induced portions of the first and second voltage signals 253A, 253B accurately represent the induced voltages and are related to the flow rate of the fluid in the flowtube 203. However, respective noise portions of the voltage signals 253A, 253B are attributable to sources of noise (e.g., a DC potential between the first and second electrodes 215A, 215B) and detract from the accuracy of the voltage signals. One skilled in the art will appreciate that the flow rate of the fluid flowing through the flow path 207 is related to the difference between the flow-induced portions of the first and second voltage signals 253A, 253B under normal operating conditions.

Under normal operating conditions each of the first and second voltage signal 253A, 253B changes periodically with the periodic changes in electromagnetic field strength (i.e., at the drive frequency f). The flow-induced portion of the first voltage signal 253A is equal in magnitude and opposite in sign (i.e., 180° out of phase) with respect to the flow-induced portion of the second voltage signal 253B under normal operating conditions. However, if the flowmeter 201 has a fluid leak, a short circuit can be created between either of the first and second electrodes 215A, 215B and the flowtube sidewall 205. For example, when a fluid path forms between one the second electrode 215B and the flowtube wall 205, the fluid path electrically connects the electrode and the flowtube wall 205, creating a short circuit at the electrode. As a result, the second voltage signal 253B produced by the second electrode 215B is substantially constant (i.e., does not vary significantly in response to variations in the electromagnetic field induced in the fluid by periodic changes in the drive signal 251), as illustrated in FIG. 7.

Figure 8:
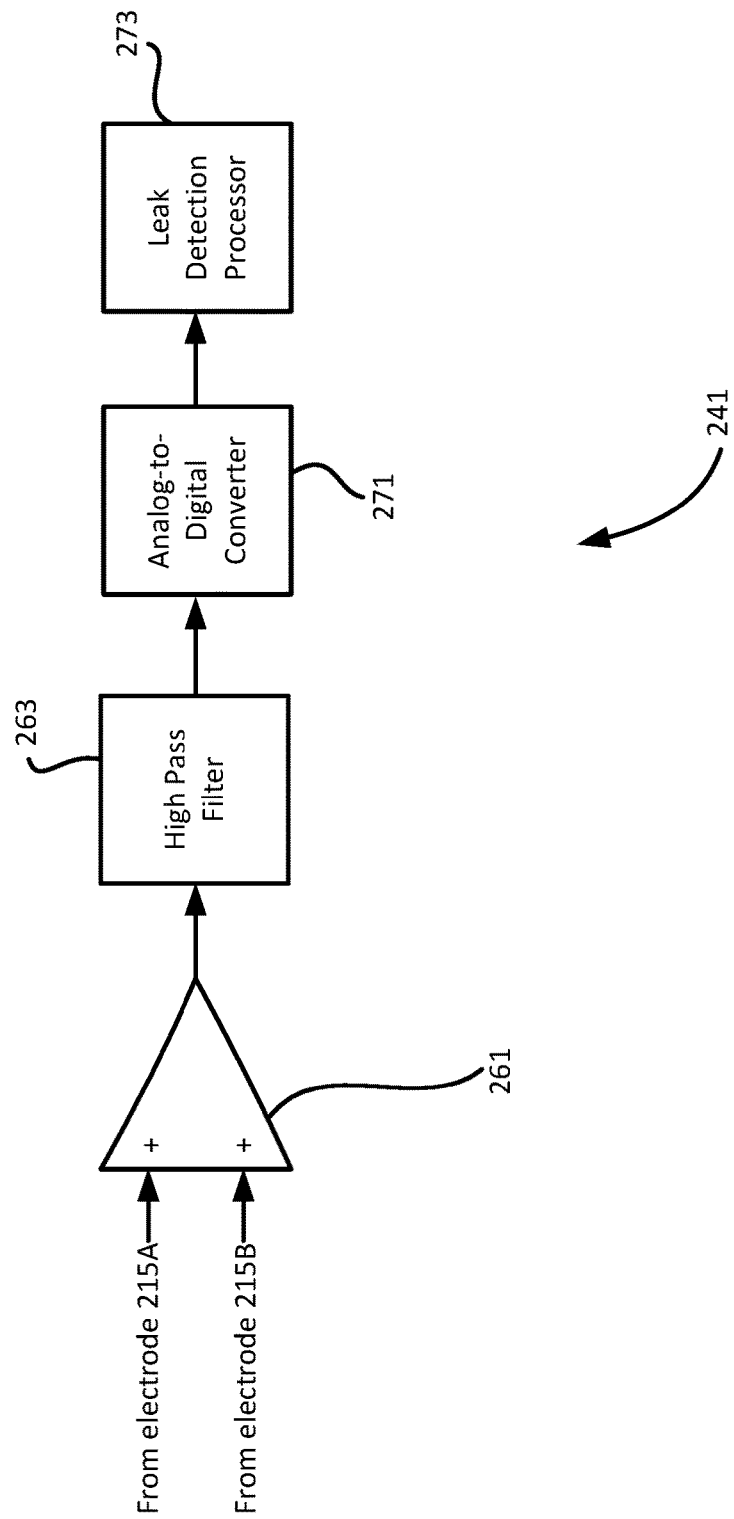
FIG. 8 a schematic diagram illustrating an example of a circuit for leak detection.

Referring to FIGS. 7 and 8, the leak detection system 241 is operatively connected to the first and second electrodes 215A, 215B to receive the first and second voltage signals 253A, 253B produced by the electrodes. The leak detection system 241 is configured to analyze a content of the at least one of the voltage signals 253A, 253B at the drive frequency f to determine whether the signal is affected by a leak. For example, the leak detection system 214 can use the drive frequency content of one or both of the signals 253A, 253B to determine whether either or both of the signals vary periodically at the drive frequency for whether the amount of variation in either of the signals at the drive frequency is suppressed below a normal (i.e., significant) amount of variation. When the leak detection system 241 determines that one or more of the signals produced by the electrodes 241 are affected by a leak in the flowmeter, it provides an output indicative of a detected leak.

The leak detection system 241 illustrated in FIG. 8 includes a summing amplifier 261 operatively connected to the first and second electrodes 215A, 215B to receive the first and second voltage signals 253A, 253B. The summing amplifier 261 is configured to add the voltage signals 253A, 253B to generate a summation signal. As discussed in further detail below, the leak detection system 241 analyzes a content of the summation signal at the drive frequency to determine whether either of the first and second voltage signals 253A, 253B is affected by a leak. A primary source of noise in the summation signal is caused by an inherent DC potential between the first and second electrodes 215A, 215B. The DC potential can be a differential mode potential, a common mode potential, or combination differential and common mode potential. Under normal operating conditions, the flow-induced portion of the first voltage signal 253A is equal in magnitude and opposite in sign (i.e., 180° out of phase) with respect to the second voltage signal 253B. Thus when no noise is present, the output of the summing amplifier 261 should be a substantially constant zero signal. However, the inherent DC potential and other noise can cause the sum of the first and second electrode signals 253A, 253B under normal operating conditions to be non-zero. To mitigate the effects of the DC potential between the two electrodes, a high pass filter 263 with a cutoff frequency set lower than the drive frequency receives the output of the summing amplifier 261. The high pass filter 263 suppresses at least a portion of the summation signal attributable to the DC potential between the first and second electrodes 215A, 215B.

With further reference to FIGS. 7 and 8, under normal operating conditions the high pass filter 263 outputs a filtered summation signal 265 that is substantially constant and substantially close to zero. However, when, for example, fluid leaks through the seal formed between the head 219 of the second electrode 215B and the liner 211, a short circuit is created. As illustrated in FIG. 7, when a short circuit is formed between the second electrode 215B and the flowtube wall 205, the second voltage signal 253B becomes substantially constant. As a result, the second voltage signal 253B is not equal in magnitude and opposite in sign with respect to the first voltage signal 253A, and the summation signal 265 becomes periodic in nature. Accordingly, the leak detection system 241 can determine whether either of the first and second voltage signals 253A, 253B is affected by a leak in the flowmeter 201 by detecting the presence of significant periodic changes in the summation signal 265.

The leak detection system 241 in FIG. 8 includes an analog-to-digital converter 271 that samples the summation signal 265 and generates a digital output signal (i.e., a digital summation signal) representative of the summation signal. A digital leak detection processor 273 receives the digital summation signal and analyzes a content of the summation signal 265 at the drive frequency f to determine whether either of the voltage signals 253A, 253B is affected by a leak in the flowmeter. Though the high pass filter 263 can eliminate some of the DC offset from the output of the summing amplifier 261 (including both common and differential DC offset), a portion of the summation signal 265 can still be attributable to the DC potential between the first and second electrodes 215A, 215B. Moreover, the energy content of the summation signal 265 still includes frequencies above the cutoff frequency of the high pass filter 263.

To minimize the effect of this noise on the leak determination, the leak detection processor 273 performs a Fourier analysis (e.g., a digital Fourier transform) on the summation signal 265 to analyze the energy content of the summation signal 265 at the drive frequency f. In a suitable embodiment, the leak detection processor 273 uses a Fourier transform to calculate a spectral number F(bin) for the summation signal 265 at the drive frequency f and converts the spectral number into an amplitude $V_f$ of the summation signal at the drive frequency (i.e., a representation of the energy of the summation signal at the drive frequency). Under normal operating conditions, the drive frequency amplitude $V_f$ should be close to zero. When the leak detection processor determines the amplitude $V_f$ has strayed too far from zero (e.g., by comparing the amplitude to a threshold), it determines that one of the first and second voltage signals 253A, 253B is affected by a leak in the flowmeter 201 and provides an output indicative of a detected leak.

Figure 9:
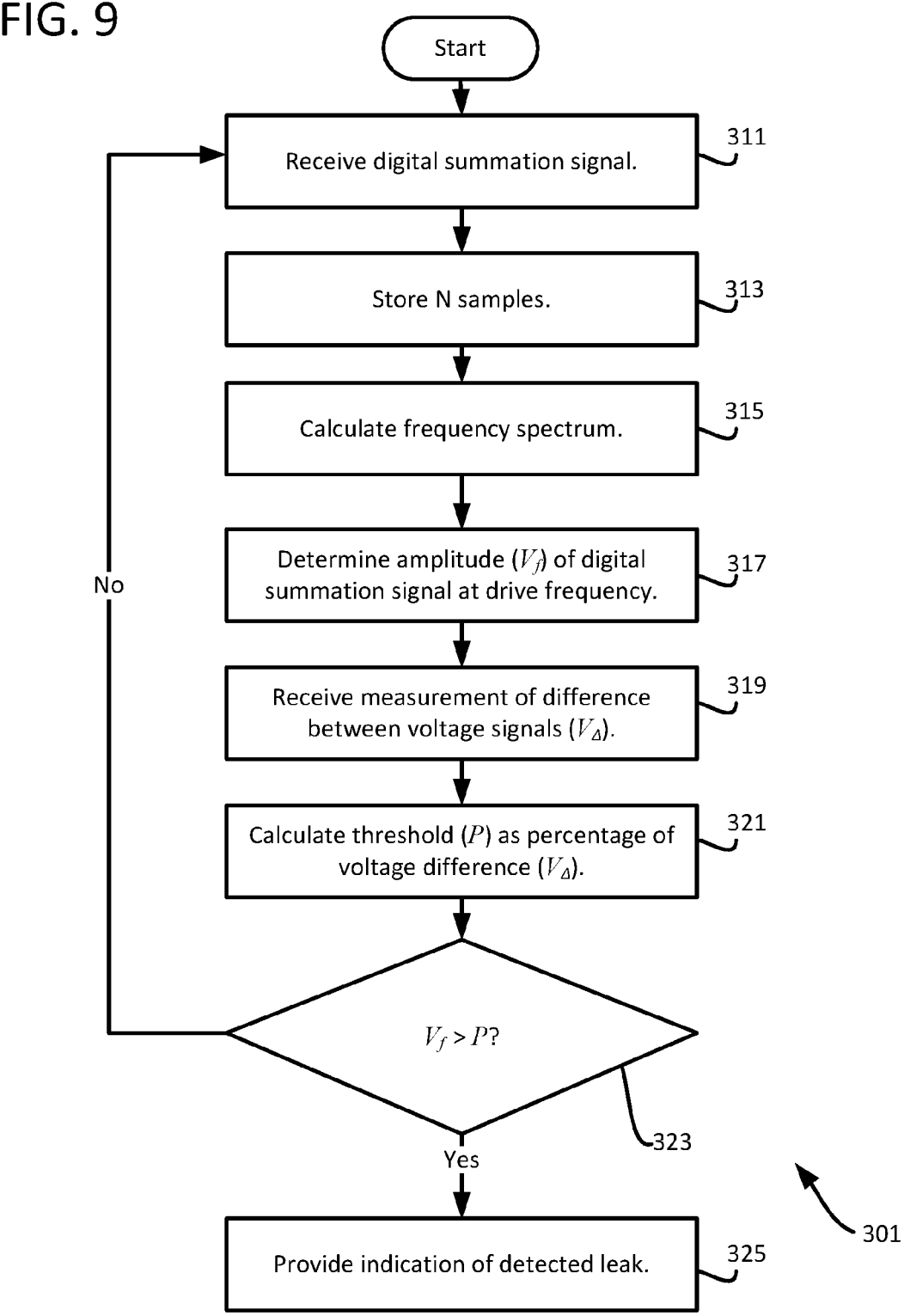
FIG. 9 is a flowchart illustrating the steps and decision block of one method of detecting a leak in the flowmeter of FIG. 6 using the circuit of FIG. 8.

Referring to FIG. 9, in one method 301 of detecting a leak in the flowmeter 201, the analog-to-digital converter 271 samples the summation signal 265 (step 311) during a sampling interval corresponding in time with one or more complete cycles of the drive signal 251 (i.e., an integral number of drive cycles). At step 313 the leak detection processor 273 stores N samples of the summation signal 265 taken during the sampling interval in a buffer. Thus, the buffer stores a digital representation of the summation signal 265 over one or more complete drive cycles. For example, in one embodiment, the drive frequency f is a constant low frequency (e.g., 7 Hz) and the analog-to-digital converter 271 samples the summation signal 265 at a high frequency (e.g., 4800 Hz). The buffer preferably stores a large number of samples (e.g., 3500 samples), which represents several complete drive cycles (e.g., 5 drive cycles).

At step 315, the leak detection processor 273 uses Fourier analysis (e.g., the discrete Fourier transform) and the N samples stored in the buffer to calculate a spectral number F(bin) for the summation signal 265 at the drive frequency f. For example, the leak detection processor 273 can use the discrete Fourier transform to calculate a frequency spectrum for the summation signal 265 and determine the spectral number F(bin) from the frequency spectrum, where bin corresponds with the spectral array index for the drive frequency f. The bin index for the drive frequency f can, in a suitable embodiment, be calculated by dividing the sampling frequency by the number of samples N, plus 1. As an alternative to calculating a frequency spectrum, the leak detection processor 273 can use Fourier analysis to calculate the drive frequency spectral number F(bin) directly using techniques such as cross-correlation or autocorrelation. At step 317 the leak detection processor 273 determines the amplitude $V_f$ of the summation signal 265 at the drive frequency f using equation 1.

$$V_f = F(\text{bin})\frac{\pi}{N}. \qquad \text{Equation 1}$$

The amplitude $V_f$ is representative of the energy in the summation signal 265 at the drive frequency f. The number of samples N suitably corresponds with an integral number of drive cycles. If the number of samples N does not corresponds to an integral number of drive cycles, the drive frequency will fall between two points in the frequency domain. The calculation would be less accurate due to spectral leakage. However, a gross measurement can be sufficient to detect a leak. Thus, it is understood the number of samples N does not need to be limited to the number of samples in an integral number of drive cycles to practice the invention.

At step 319 the leak detection processor 273 receives a difference signal $V_\Delta$ representative of magnitude of a difference between the first and second voltage signals 253A, 253B from a flow rate measurement system (not shown) of the flowmeter 201. The leak detection processor 273 dynamically determines a threshold P as a percentage (e.g., from about 10 percent to about 40 percent) of the voltage difference $V_\Delta$ at step 321. At decision block 323, the leak detection processor 273 compares the threshold P to the amplitude $V_f$ of the summation signal 265 at the drive frequency f. If the amplitude $V_f$ is greater than the threshold P, the leak detection processor 273 provides an indication that one of the first and second voltage signals 253A, 253B is affected by a leak in the flowmeter 201 (step 325). If the amplitude $V_f$ is not greater than the threshold P, the leak detection method 301 restarts at step 311. Though the illustrated embodiment dynamically calculates the threshold P as a percentage of the voltage difference $V_\Delta$, it will be understood that other embodiments can compare the amplitude $V_f$ of the summation signal 265 at the drive frequency f to a constant threshold to determine whether a leak in the flowmeter 201 affects either of the voltage signals 253A, 253B.

Figure 10:
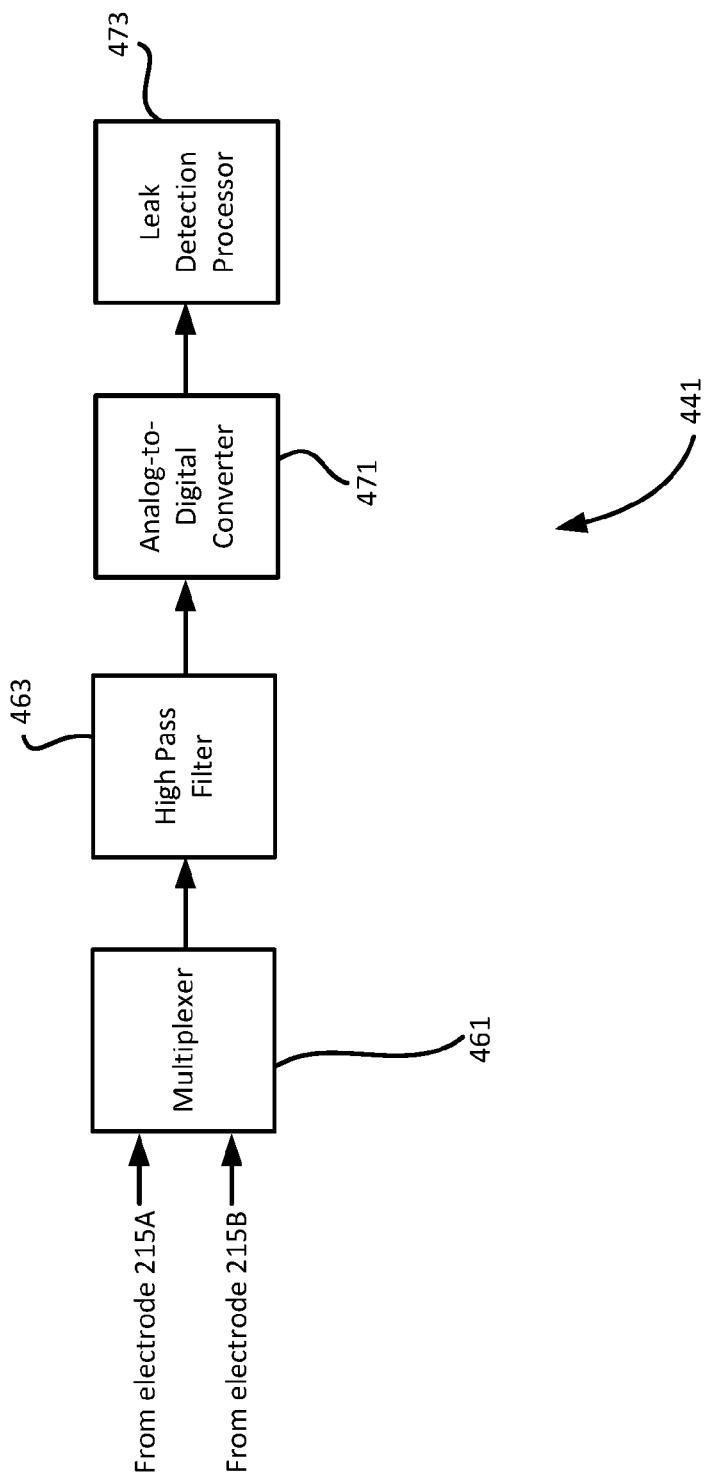
FIG. 10 is a schematic diagram illustrating another circuit for leak detection in the flowmeter of FIG. 6.

Referring to FIG. 10, another embodiment of a leak detection system suitable for use with the flowmeter 201 is generally indicated at reference number 441. The leak detection system 441 includes a multiplexer 461 that is operatively connected to the first and second electrodes 215A, 215B to receive the first and second voltage signals 253A, 253B from the electrodes. The multiplexer 461 is configured to generate a multiplexed signal, which includes alternating sequences of the voltage signals 253A, 253B spliced together serially in the time domain. A high pass filter 463 receives the multiplexed signal from the multiplexer 461 and suppresses a portion of the multiplexed signal attributable to a DC potential between each of the first and second electrodes 215A, 215B and ground. An analog-to-digital converter 471 samples the output of the high pass filter 463 and generates a digital output representative of the filtered multiplexed signal. As discussed in further detail below, a leak detection processor 473 receives the digital filtered multiplexed signal and uses it to analyze a content of the first voltage signal 253A at the drive frequency f and a content of the second voltage signal 253B at the drive frequency. The leak detection processor 473 compares the drive frequency contents of the first and second voltage signals 253A, 253B to determine whether either of the first and second voltage signals is affected by a leak. Though the illustrated leak detection processor 473 receives the first and second voltage signals 253A, 253B from a single input using a multiplexed signal, it is also contemplated that another leak detection processor could perform a similar processor by receiving the first and second voltage signals on two separate inputs.

Figure 11:
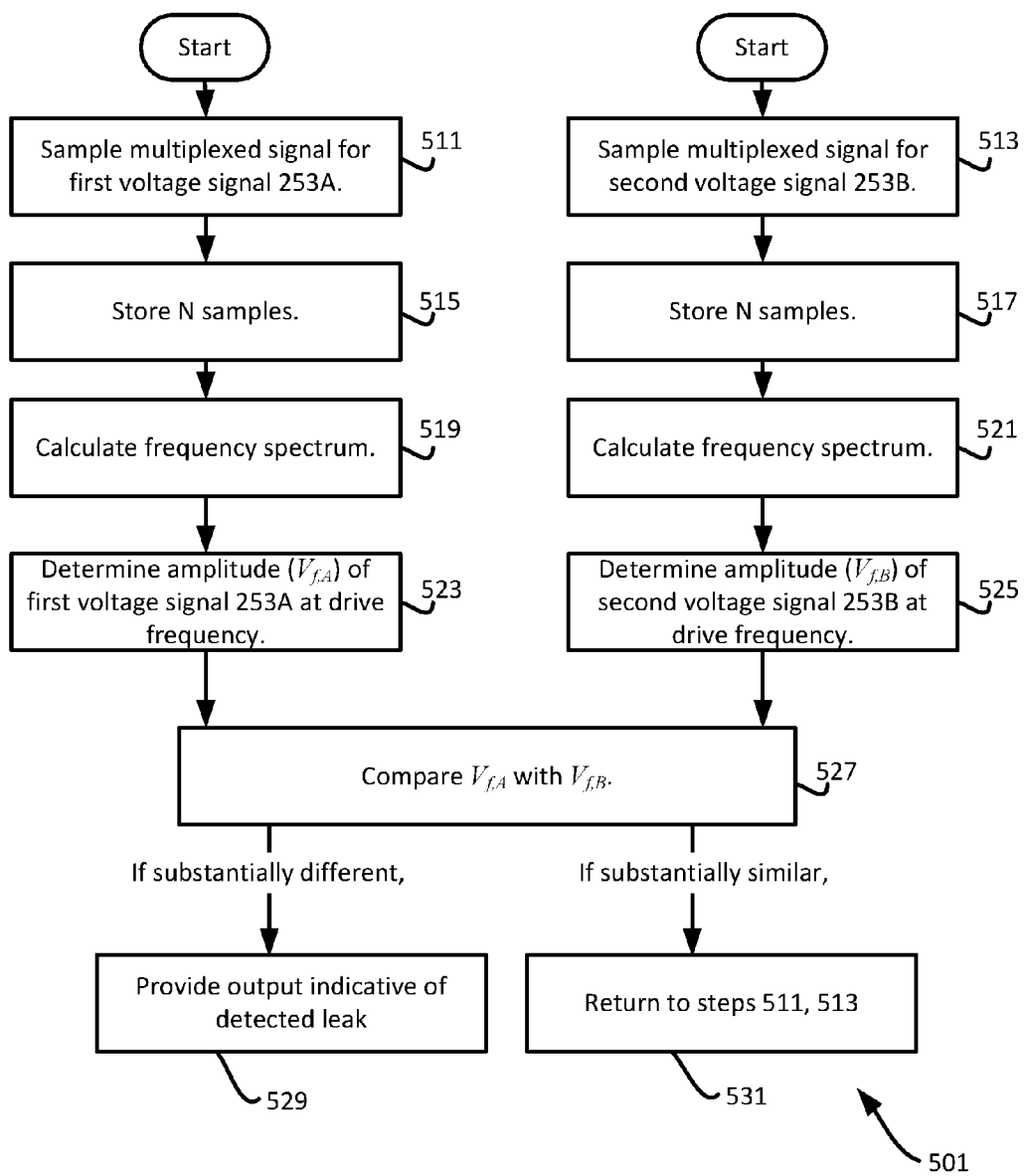
FIG. 11 is a flowchart illustrating the steps of another method of detecting a leak in the flowmeter of FIG. 6 using the circuit of FIG. 10.

Referring to FIG. 11, in one method 501 of detecting a leak in the flowmeter 201 using the leak detection system 441, the analog-to-digital converter 471 samples the digital multiplexed signal during first and second sampling intervals (steps 511, 513). Suitably, the samples from the first sampling interval define a first sample set representing the first voltage signal 253A and corresponding in time with one or more complete drive cycles (step 511). Likewise the samples from the second sampling interval suitably define a second sample set representing the second voltage signal 253B and corresponding in time with one or more complete drive cycles (step 513). The leak detection processor 473 stores $N_A$ samples from the first sample set in a first buffer (step 515), which collectively form a digital representation of the first voltage signal 253A during the first sampling interval. The leak detection processor 473 likewise stores $N_B$ samples from the second sample set in a second buffer (step 517), which collectively form a digital representation of the second voltage signal 253B during the second sampling interval.

To minimize the effect of noise on the leak determination, the leak detection processor 473 uses Fourier analysis to calculate a frequency spectrum for each of the first and second voltage signals 253A, 253B from the first and second sample sets stored in the first and second buffers (steps 519, 521). Additionally or in the alternative, the leak detection processor 473 calculates a spectral number $F(bin)_A$, $F(bin)_B$ for each of the first and second voltage signals 253A, 253B from the stored first and second sample sets. Using equation 1 and the spectral numbers $F(bin)_A$ and $F(bin)_B$, the leak detection processor 473 calculates respective amplitudes $V_{f,A}$, $V_{f,B}$ of the first and second voltage signals 253A, 253B at the drive frequency f (steps 523, 525).

As discussed above, under normal operating conditions, the flow-induced portions of the first and second voltage signals 253A, 253B will be substantially equal in magnitude. Thus, one skilled in the art will appreciate that the amplitudes $V_{f,A}$, $V_{f,B}$ of the first and second voltage signals 253A, 253B, which represent the amount of energy in the respective signals at the drive frequency f, will be substantially equal under normal operating conditions. However, when a leak creates a short circuit at, for example, the electrode 215B as shown in FIG. 7, the amplitude $V_{f,B}$ of the voltage signal 253B at the drive frequency f will be significantly lower than the amplitude value $V_{f,A}$ of the voltage signal 253A at the drive frequency. Thus, at step 527, the leak detection processor 473 compares the amplitude $V_{f,A}$ of the first voltage signal 253A to the amplitude $V_{f,B}$ of the second voltage signal 253B. If the leak detection processor 473 determines that the amplitude $V_{f,A}$ of the first voltage signal 253A is significantly different than the amplitude $V_{f,B}$ of the second voltage signal 253B, it provides an indication of a detected leak at step 529. If the leak detection processor 473 determines the amplitudes $V_{f,A}$, $V_{f,B}$ of the first and second voltage signals 253A, 253B are substantially equal, it returns to steps 511 and 513 at step 531. In one or more embodiments, the leak detection processor 473 compares the amplitude $V_{f,A}$ of the first voltage signal 253A to the amplitude $V_{f,B}$ of the second voltage signal 253B by calculating a difference between the first and second voltage signals and comparing the calculated difference to a threshold (e.g., a constant threshold or a variable threshold determined dynamically, for example, as a percentage of either of the amplitudes $V_{f,A}$, $V_{f,B}$). When the leak detection processor 473 determines the difference between the amplitudes $V_{f,A}$, $V_{f,B}$ of the first and second voltage signals 253A, 253B exceed the threshold, it provides an output indicative of a detected leak.

The leak detection systems 241, 441 and the methods 301, 501 for detecting a leak in a flowmeter 201 advantageously eliminate the effects of the DC potential between the first and second electrodes 215A, 215B and other sources of noise by using Fourier analysis to isolate the content of the voltage signals 253A, 253B at the drive frequency f from portions of the signal. The amplitude(s) of the voltage signals 253A, 253B at the drive frequency f represent the flow-induced portion of the voltage signals and suppress other portions of the voltage signals. Thus, only those portions of the voltage signals 253A, 253B that accurately reflect whether the voltage signals properly vary with periodic changes in the electromagnetic field are used to determine whether a leak affects either of the voltage signals. It is believed that isolating the flow-induced portions of the voltage-signals 253A, 253B from other portions of the signals inhibits noise, such as DC potentials inherent in the voltage signals, from significantly influencing the leak determination results. In addition, the construction of the insulating sleeves 117, 217 creates a direct fluid path between the electrodes 115, 215A, 215B and the respective flowtube walls 105, 205, which creates an intentional short circuit when a leak is present that is readily detectable using the leak detection systems 141, 241, 441.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements. In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A leak detection system for detecting a leak in an electromagnetic flowmeter having an electromagnetic field source for generating an electromagnetic field in a fluid flowing through the flowmeter that changes periodically at a drive frequency and first and second electrodes to detect a voltage induced in the fluid, said leak detection system comprising:
a leak detection processor connected to the first and second electrodes to receive first and second signals representative of the voltage detected by the first and second electrodes, respectively, the leak detection processor being configured to analyze a content of at least the first signal at the drive frequency to determine whether the first signal is affected by a leak in the flowmeter and provide an output indicative of a detected leak when the leak detection processor determines that the first signal is affected by the leak in the flowmeter.

2. The leak detection system of claim 1 further comprising a summing amplifier connected to the first and second electrodes to receive the first and second signals, the summing amplifier being configured to add the first and second signals to generate a summation signal received by the leak detection processor.

3. The leak detection system of claim 2 wherein analyzing the content of the first signal at the drive frequency comprises analyzing a content of the summation signal at the drive frequency to determine whether either of the first signal and the second signal is affected by a leak in the flowmeter.

4. The leak detection system of claim 3 wherein the leak detection processor is configured to compare said content of the summation signal at the drive frequency to a threshold to determine whether either of the first signal and the second signal is affected by a leak in the flowmeter.

5. The leak detection system of claim 4 wherein the leak detection processor is configured to receive a difference signal representative of a magnitude of a difference between the first signal and the second signal and to dynamically determine the threshold as a percentage of the difference signal.

6. The leak detection system of claim 5 wherein said percentage is from about 10 percent to about 40 percent of the difference signal.

7. The leak detection system of claim 3 wherein the leak system is configured to sample the summation signal during a sampling interval to create a sample set corresponding in time with one or more complete drive cycles.

8. The leak detection system of claim 7 wherein said content of the summation signal at the drive frequency is an amplitude of the summation signal at the drive frequency and wherein the leak detection processor is configured to determine said amplitude from the sample set using Fourier analysis.

9. The leak detection system of claim 2 further comprising a high pass filter connected between the summing amplifier and the leak detection processor to suppress a portion of the summation signal attributable to a DC potential between the first and second electrodes.

10. The leak detection system of claim 1 wherein the leak detection processor is further configured to analyze a content of the second signal at the drive frequency to determine whether either of the first signal and the second signal is affected by a leak in the flowmeter.

11. The leak detection system of claim 10 further comprising a multiplexer operatively connected to the first and second electrodes to receive the first and second signals, the multiplexer being configured to generate a multiplexed signal comprising an alternating sequence of the first and second signals, the leak detection processor receiving the first and second signals from the multiplexed signal.

12. The leak detection system of claim 10 wherein the leak detection processor is configured to compare said content of the first signal with said content of the second signal to determine whether either of the first signal and the second signal is affected by a leak in the flowmeter.

13. The leak detection system of claim 12 wherein the leak detection system is configured to sample the first signal during a first sampling interval to create a sample set of the first signal corresponding in time with one or more complete drive cycles and to sample the second signal during a second sampling interval to create a sample set of the second signal corresponding in time with one or more complete drive cycles.

14. The leak detection system of claim 13 wherein said content of the first signal is an amplitude of the first signal at the drive frequency during the respective one or more complete drive cycles and said content of the second signal is an amplitude of the second signal at the drive frequency during the respective one or more complete drive cycles, the leak detection processor determining the amplitudes of the first and second signals from the sample set of the first signal and the sample set of the second signal using Fourier analysis.

15. The leak detection system of claim 14 wherein the leak detection processor is configured to determine whether a difference between the determined amplitudes of the first and second signals exceeds a threshold.

16. The leak detection system of claim 1 in combination with said electromagnetic flowmeter, said electromagnetic flowmeter comprising;
a flowtube configured to carry the fluid, the flowtube having a flowtube wall comprising a conductive material, the flowtube wall having an inner surface surrounding a fluid flow path for the fluid;

a non-conductive liner positioned to electrically insulate the flowtube wall from the fluid, the flowtube and non-conductive liner defining first and second electrode mounting holes;

the first and second electrodes extending through the first and second electrode mounting holes, respectively, the first and second electrodes and the non-conductive liner forming respective fluidic seals between the first and second electrode mounting holes and the fluid flow path, at least a portion of each of the first and second electrodes being arranged in fluid communication with the flowtube within the respective electrode mounting hole.

17. A method for detecting a leak in an electromagnetic flowmeter having an electromagnetic field source configured to generate an electromagnetic field in a fluid flowing through the flowmeter that changes periodically at a drive frequency and at least first and second electrodes configured to detect a voltage induced in the fluid in response to the electromagnetic field, said method comprising:

analyzing a content of a signal from at least one of the first and second electrodes at the drive frequency;

detecting a leak in the flowmeter using said content of the first signal; and providing an indication of a detected leak when the leak is detected.

18. The method of claim 17 wherein analyzing a content of a signal comprises summing a first signal from the first electrode and a second signal from the second electrode to generate a summation signal and analyzing a content of the summation signal at the drive frequency to determine whether either of the first signal and the second signal is affected by a leak in the flowmeter.

19. The method of claim 18 wherein analyzing a content of the summation signal comprises comparing said content of the summation signal at the drive frequency to a threshold to determine whether either of the first signal and the second signal is affected by a leak in the flowmeter.

20. The method of claim 19 further comprising generating a difference signal representative of a magnitude of a difference between the first signal and the second signal and dynamically determining the threshold as a percentage of the difference signal.

* * * * *